United States Patent
Mana et al.

(10) Patent No.: US 9,302,638 B2
(45) Date of Patent: Apr. 5, 2016

(54) UNITARY ENERGY ABSORBING ASSEMBLY AND METHOD OF MAKING THE SAME

(75) Inventors: Dinesh Mana, Bangalore (IN); Dhanendra Kumar Nagwanshi, Bangalore (IN); Manish Chaturvedi, Bangalore (IN)

(73) Assignee: SABIC GLOBAL TECHNOLOGIES B.V. (NL)

( * ) Notice: Subject to any disclaimer, the term of this patent is extended or adjusted under 35 U.S.C. 154(b) by 0 days.

(21) Appl. No.: 12/915,440

(22) Filed: Oct. 29, 2010

(65) Prior Publication Data

US 2012/0104778 A1    May 3, 2012

(51) Int. Cl.
*B60R 19/18*    (2006.01)
*B60R 19/34*    (2006.01)

(52) U.S. Cl.
CPC ......... *B60R 19/18* (2013.01); *B60R 2019/1846* (2013.01)

(58) Field of Classification Search
CPC .. B60R 19/18; B60R 2019/1846; B60R 19/34
USPC .................................. 293/120–122, 133, 155
See application file for complete search history.

(56) References Cited

U.S. PATENT DOCUMENTS

| | | | |
|---|---|---|---|
| 3,883,168 A * | 5/1975 | Goupy et al. | ................. 293/120 |
| 3,888,531 A | 6/1975 | Straza et al. | |
| 3,930,665 A | 1/1976 | Ikawa | |
| 3,933,387 A | 1/1976 | Salloum et al. | |
| 3,997,207 A | 12/1976 | Norlin | |
| 4,029,350 A | 6/1977 | Goupy et al. | |
| 4,186,915 A | 2/1980 | Zeller et al. | |
| 4,533,166 A | 8/1985 | Stokes | |
| 4,573,724 A | 3/1986 | Campen | |
| 4,652,032 A | 3/1987 | Smith | |
| 4,671,550 A | 6/1987 | Molnar | |
| 4,762,352 A | 8/1988 | Enomoto | |
| 4,856,833 A | 8/1989 | Beekman | |

(Continued)

FOREIGN PATENT DOCUMENTS

| | | |
|---|---|---|
| DE | 102004008740 A1 | 6/2005 |
| DE | 202008012398 * | 3/2010 |

(Continued)

OTHER PUBLICATIONS

Translation of KR2009064840.*

(Continued)

*Primary Examiner* — Dennis H Pedder
(74) *Attorney, Agent, or Firm* — Cantor Colburn LLP

(57) ABSTRACT

An energy absorbing assembly can comprise: a support structure having a first wall and an outer wall that extend in an x direction from a first end to a second end; an energy absorber that extends across the first wall of the support structure, the energy absorber comprising a plurality of crushable members are configured to crush and absorb energy upon impact, a first crash can; and a second crash can, wherein the first and second crash cans extend from the first and second ends of the support structure. The energy absorbing assembly is an in situ formed single element. A method of making an energy absorbing assembly can comprise: introducing molten thermoplastic material to a mold to in situ form the energy absorbing assembly and removing the energy absorbing assembly from the mold by moving the mold in a y direction.

17 Claims, 8 Drawing Sheets

(56) References Cited

U.S. PATENT DOCUMENTS

| | | |
|---|---|---|
| 4,941,701 A | 7/1990 | Loren |
| 4,951,986 A | 8/1990 | Hanafusa et al. |
| 5,056,840 A | 10/1991 | Eipper et al. |
| 5,141,273 A | 8/1992 | Freeman |
| 5,219,197 A | 6/1993 | Rich et al. |
| 5,265,925 A | 11/1993 | Cox et al. |
| 5,290,078 A | 3/1994 | Bayer et al. |
| 5,293,973 A | 3/1994 | Thum |
| 5,385,375 A | 1/1995 | Morgan et al. |
| 5,404,974 A | 4/1995 | Thum et al. |
| 5,425,561 A | 6/1995 | Morgan |
| 5,746,419 A | 5/1998 | McFadden et al. |
| 5,876,078 A | 3/1999 | Miskech et al. |
| 5,988,713 A | 11/1999 | Okamura et al. |
| 6,082,792 A | 7/2000 | Evans et al. |
| 6,179,355 B1 | 1/2001 | Chou et al. |
| 6,247,745 B1 | 6/2001 | Carroll, III et al. |
| 6,286,879 B1 * | 9/2001 | Haque et al. ............... 293/120 |
| 6,299,226 B1 * | 10/2001 | Kroning et al. ............. 293/120 |
| 6,364,384 B1 | 4/2002 | Kemp et al. |
| 6,406,081 B1 | 6/2002 | Mahfet et al. |
| 6,554,332 B1 | 4/2003 | Schuster et al. |
| 6,575,510 B2 | 6/2003 | Weissenborn |
| 6,663,150 B1 | 12/2003 | Evans |
| 6,669,251 B2 | 12/2003 | Trappe |
| 6,685,243 B1 | 2/2004 | Evans |
| 6,746,061 B1 | 6/2004 | Evans |
| 6,994,384 B2 | 2/2006 | Shuler et al. |
| 7,044,515 B2 | 5/2006 | Mooijmaan et al. |
| 7,806,448 B2 * | 10/2010 | Allen et al. ................. 293/120 |
| 2002/0060462 A1 | 5/2002 | Glance |
| 2003/0020291 A1 | 1/2003 | Roussel et al. |
| 2003/0047952 A1 | 3/2003 | Trappe |
| 2003/0080573 A1 | 5/2003 | Marijnissen et al. |
| 2003/0189343 A1 | 10/2003 | Evans et al. |
| 2009/0045638 A1 * | 2/2009 | Handing et al. ............. 293/155 |
| 2009/0160203 A1 * | 6/2009 | Garg et al. .................. 293/120 |

FOREIGN PATENT DOCUMENTS

| | | | |
|---|---|---|---|
| DE | 202009006264 | * | 10/2010 |
| EP | 1837244 A1 | | 9/2007 |
| FR | 2835792 A1 | | 8/2003 |
| FR | 2887508 A1 | | 12/2006 |
| JP | 11255049 | * | 9/1999 |
| KR | 2005045076 | * | 5/2005 |
| KR | 2009064840 | * | 6/2009 |
| KR | 10-2007-0132193 | * | 9/2009 |
| KR | 10-2009-0064840 | * | 9/2009 |
| WO | 94/27840 A1 | | 12/1994 |

OTHER PUBLICATIONS

Japanese Patent No. 11-255049 (A); Date of Publication: Feb. 23, 1999; Abstract Only; 1 Page.

Machine Translation of Japanese Patent No. 11-255049 (A); Date of Publication: Mar. 23, 1999; 7 Pages.

German Patent No. 102004008740; Publication Date: Jun. 23, 2005; Abstract Only; 1 page.

French Patent No. 2835792; Publication Date: Aug. 15, 2003; Abstract Only; 1 page.

French Patent No. 2887508; Publication Date: Dec. 29, 2006; Abstract Only, 1 page.

International Search Report; International Application No. PCT/IB2011/054487; Date of Mailing: Jan. 21, 2012; 6 pages.

Written Opinion of the International Searching Authority; International Application No. PCT/IB2011/054487; Date of Mailing: Jan. 31, 2012; 7 pages.

\* cited by examiner

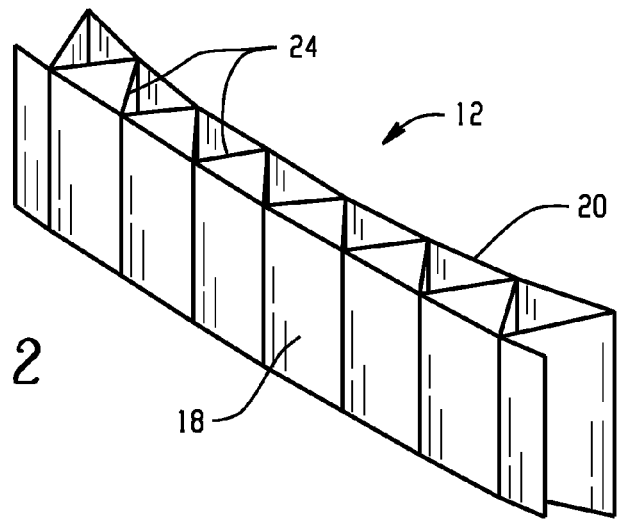
Fig. 2
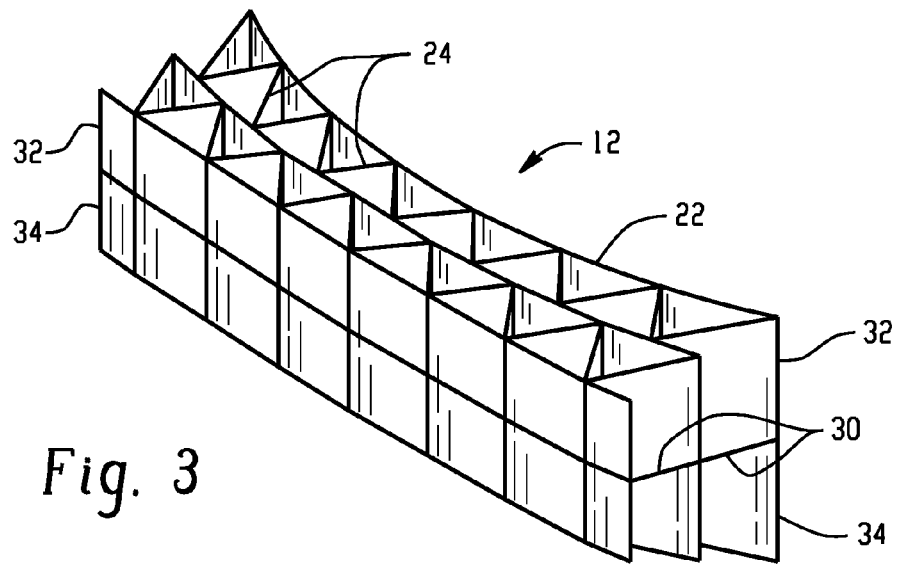
Fig. 3
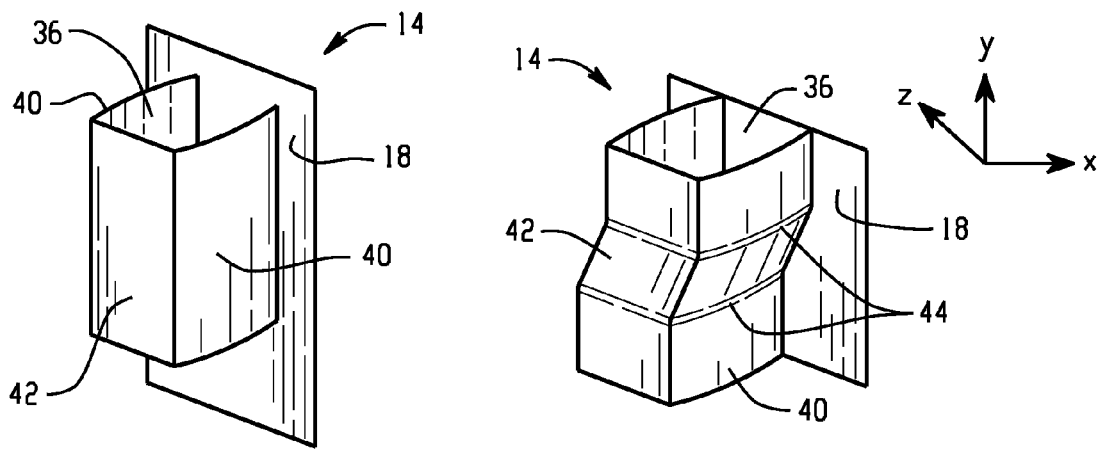
Fig. 4
Fig. 5

UNITARY ENERGY ABSORBING ASSEMBLY AND METHOD OF MAKING THE SAME

BACKGROUND

The present disclosure relates generally to energy absorbers for use in a vehicle, for example, to reduce injuries (e.g., to occupant(s), pedestrian(s), etc.) and/or to reduce vehicle damage.

Bumper systems generally extend widthwise, or transverse, across the front and rear of a vehicle and are mounted to rails that extend in a lengthwise direction. Many bumper assemblies for an automotive vehicle include a metal bumper beam and an injection molded energy absorber secured to the bumper beam. The bumper system generally further includes an energy absorber along the surface of the bumper and also a fascia for covering the energy absorber.

Beneficial energy absorbing bumper systems achieve high efficiency by building load quickly to just under the load limit of the rails and maintain that load constant until the impact energy has been dissipated. Energy absorbing systems attempt to reduce vehicle damage and/or injury as a result of a collision by managing impact energy absorption. Bumper system impact requirements are set forth by United States Federal Motor Vehicle Safety Standards (US FMVSS), Canadian Motor Vehicle Safety Standards (CMVSS), European EC E42 consumer legislation, EuroNCAP pedestrian protection requirements, Allianz impact requirements, and Asian Pedestrian Protection for lower and upper legs. In addition, the Insurance Institute for Higher Safety (IIHS) has developed different barrier test protocols on both front and rear bumper systems. These requirements must be met for the various design criteria set forth for each of the various automotive platforms and car models. If there is even very limited damage to any component of the frame of the vehicle, costs of repairing the vehicle can escalate dramatically.

This generates the need to develop low cost, lightweight, and high performance energy absorbing systems that will deform and absorb impact energy to ensure a good vehicle safety rating, absorb energy upon impact with a pedestrian to reduce the injuries suffered by the pedestrian, and reduce vehicle damage in low speed collisions, e.g., to inhibit frame damage. Different components due to their inherent geometry and assembly requirements need different energy absorber designs to satisfy the impact criteria. Therefore, the automotive industry is continually seeking economic solutions to improve the overall safety rating of a vehicle. Hence, there is a continual need to provide a solution that would reduce injuries and/or reduce vehicle damage and/or enhance a vehicle safety rating.

BRIEF DESCRIPTION

Disclosed, in various embodiments, are energy absorbing devices and methods of making energy absorbing devices that can be used in conjunction with various vehicle components.

In an embodiment, an energy absorbing assembly can comprise: a support structure having a first wall and an outer wall that extend in an x direction from a first end to a second end; an energy absorber that extends across the first wall of the support structure, the energy absorber comprising a plurality of crushable members are configured to crush and absorb energy upon impact, a first crash can; and a second crash can, wherein the first and second crash cans extend from the first and second ends of the support structure. The energy absorbing assembly is an in situ formed single element.

In one embodiment a vehicle comprises a body and rails and an energy absorbing assembly. The energy absorbing assembly comprises a support structure having a first wall and an outer wall that extend in an x direction from a first end to a second end; an energy absorber that extends across the first wall of the support structure, the energy absorber comprising a plurality of crushable members are configured to crush and absorb energy upon impact, a first crash can; and a second crash can, wherein the first and second crash cans extend from the first and second ends of the support structure and wherein the first and second crash cans attach to the rails without a bumper beam. The energy absorbing assembly is an in situ formed single element.

In one embodiment, a method of making an energy absorbing assembly can comprise: introducing molten thermoplastic material to a mold to, in situ form the energy absorbing assembly comprising a support structure, energy absorber, first crash can, and second crash can, wherein the support structure has a first wall and an outer wall having ends, wherein the first and second crash cans extend from the ends of the support structure, and the energy absorber extends across the first wall of the support structure; and removing the energy absorbing assembly from the mold by moving the mold in a y direction.

These and other non-limiting characteristics are more particularly described below.

BRIEF DESCRIPTION OF THE DRAWINGS

The following is a brief description of the drawings wherein like elements are numbered alike and which are presented for the purposes of illustrating the exemplary embodiments disclosed herein and not for the purposes of limiting the same.

FIG. 2 is an isometric view of a bumper beam.

FIG. 3 is an isometric view of a bumper beam.

FIG. 4 is an isometric view of a portion of an energy absorber.

FIG. 5 is an isometric view of a portion of an energy absorber.

DETAILED DESCRIPTION

Figure 1:
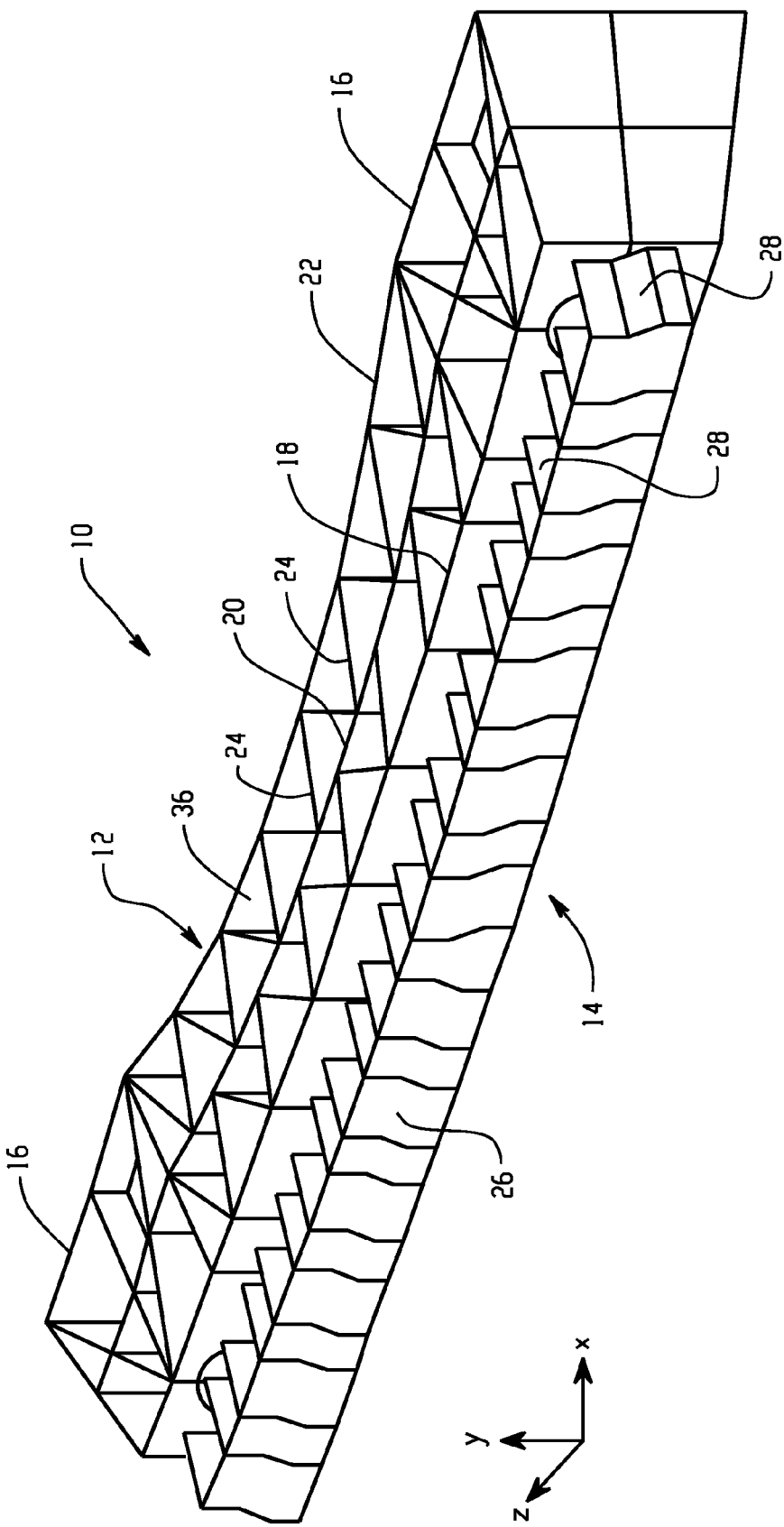
FIG. 1 is an isometric view of an energy absorbing assembly comprising a bumper beam, an energy absorber, and crash cans.

Disclosed herein, in various embodiments, are energy-absorbing assemblies which can be used in conjunction with vehicle components, e.g., to minimize the damage and/or injury suffered during an impact. The energy absorbing assembly can comprise a support structure, an energy absorber (e.g., crush lobes), and crash cans, each of which comprise a plastic material, and all of which are formed in situ as a singular, solitary component. The energy absorbing assemblies eliminate the metal bumper beam and comprise an integrated assembly of a thermoplastic support structure extending between plastic crash cans, with a plastic energy absorber along a side of the support structure. The crash cans are configured to protect the vehicle rails, e.g., for impacts of greater than or equal to 15 km/hr. The crash cans can absorb impact energies of 3,000 Joules, in some embodiments, impact energies of 4,000 Joules, specifically, impact energies of 6,000 Joules, and even impact energies of 10,000 Joules. The plastic energy absorber comprises crush lobes configured to aid in pedestrian protection (e.g., for lower leg impacts less than or equal to 40 kilometers per hour (km/hr) (such as impacts of 30-40 km/hr). The energy absorber can absorb impact energy of 450 Joules, and in some embodiments, impact energies of 850 Joules, specifically, impact energies of 1,000 Joules.

The support structure, crash cans, and crush lobes are formed in situ, e.g., using a vertically moving mold (i.e., in the y direction). In some embodiments, the assembly has no outermost wall extending in the x and z directions covering the energy absorber, covering the support structure, and/or covering the crash cans (e.g., the outermost surfaces in the y direction on both sides of the assembly). The assembly can have outermost walls extending in the x and y directions on one or both sides of the assembly, over the support structure (e.g., first wall 18 and third wall 22 of FIG. 1), over the energy absorber (e.g., front wall 26 of FIG. 1), and/or over the crash cans (e.g., front face 50 and back face 52 of FIGS. 6 and 7).

In various embodiments, the crash cans form the ends of the assembly with the thermoplastic support structure extending between the crash cans. In front of the support structure and crash cans are the energy absorbers (e.g., crush lobes), extending across the assembly, across the crash cans and support structure. The crash cans can attach to the body in white (BIW), e.g., to the projecting supports (e.g., vehicle rails). A redesign was needed in order to attain this design, i.e., a unitary absorbing assembly that replaces separate elements of the metal bumper beam, energy absorbers, and crash cans. The various embodiments are formed with openings in the y direction (see FIG. 1).

The integrated assembly provides a significant reduction in the weight of the overall assembly (e.g., up to a third weight reduction compared to assemblies comprising a metal bumper beam and/or metal crash cans that meets the same energy absorption capacity) since each component comprises a thermoplastic material, while simultaneously providing high performance (e.g., controlled crushing and hence an increase in efficiency compared to metal energy absorbers) during pedestrian impacts and also during low speed collisions. Because of the integrated assembly, the energy absorbing assemblies described herein can replace metallic bumper beams and/or crash cans. The result is a reduction in time required to assemble the components and hence, a decrease in the overall cost of the assembly. The energy absorbing assembly can be manufactured utilizing various molding processes (e.g., injection molding, thermoforming, extrusion, etc.) to provide a single piece assembly (e.g., an integrally formed support structure, energy absorber, and crash can).

Although the energy absorbing assemblies disclosed herein can be used in any location in a vehicle, the energy absorbing assemblies are intended to be located at the front portion of a vehicle (e.g., in the portion of the vehicle where the engine, radiator, etc. are generally located) to protect the body in white (BIW) and components located behind the BIW from damage when an impact occurs. Generally, the energy absorbing assembly can be located in front of and attached to the BIW to serve as protection to the structure during an impact. For example, the energy absorbing assembly can be attached to the vehicle rails and/or cross members located on the BIW. The energy-absorbing component of the assembly can be located in front of the support structure to reduce the injury to a pedestrian upon impact. Crash cans assist in supporting the support structure at opposing ends (e.g., at the left end and the right end of the support structure (the support structure can have a length that is less than the distance between the vehicle rails)). The crash cans provide stiffness to protect the vehicle rails from damage after an impact. Crash cans also generally serve the function of reducing vehicle damage and driver/occupant injury during an impact. This solution is observed to be greater than or equal to 20% lighter than the prior designs while achieving the same performance, e.g., than the design disclosed in U.S. Pat. No. 7,044,515.

Metal bumper beams and crash cans are generally heavy in weight and are expensive to manufacture. Also, metal bumper beams cannot be formed integrally (e.g., in situ) with plastic energy absorbers or plastic crash cans, thus increasing the processing time with an energy absorbing assembly that comprises metal bumper beams and/or metal crash cans. Additionally, since metal bumper beams are not formed integrally with the energy absorber and crash cans, additional assembly time is necessary with metal bumper beams, which also increases the overall cost of an energy absorbing assembly utilizing a metal bumper beam. The same issues are true with metal crash cans, i.e., metal crash cans cannot be formed integrally with the metal bumper and/or plastic energy absorber, increasing both processing and assembly times for the energy absorbing assemblies. Automotive manufacturers continually desire lighter weight, highly efficient, cost effective solutions for such components of an automobile. By providing a single piece assembly where each component of the assembly comprises a thermoplastic material, significant savings in weight, processing times, and assembly times can be achieved. For example, up to a one-third reduction in weight can be observed where each component of the assembly comprises a thermoplastic material. Decreased assembly times can also be achieved with a single piece assembly. For example, the assembly time can be decreased by at least 35%.

The energy absorbing component (e.g., crush lobes) of the assembly can be designed to absorb energy and deform during impact with a pedestrian, the support structure can be designed to provide support to the energy absorber and serve as a stiff member that elastically deforms and absorbs energy during pendulum and barrier impacts, while the crash cans can be designed to plastically deform and absorb energy during Allianz impact and/or for RCAR and also can provide support for the plastic beam. In other words, the support structure has a stiffness that is between the stiffness of the crash cans and the energy absorber (e.g., crush lobes). Allianz impact refers to a test where the front of a vehicle is driven against a rigid barrier at an angle of 10 degrees to the vehicle movement direction with an overlap of 40% on the driver's side, while RCAR refers to an impact at 15 kilometers per hour (km/hr). Pendulum and barrier impact test refer to FMVSS 581.1-581.7 at variable speeds. Pendulum impact speed is 1.5 miles per hour (mph) for the corner impact on a vehicle at 30 degrees to the vehicle movement direction and 2.5 mph for all other pendulum and barrier impacts which are in the same direction as that of the vehicle movement direction.

The energy absorbing assemblies described herein are capable of meeting and/or exceeding requirements set forth for low speed crashes, e.g., ECE-42 and RCAR/Allianz/Danner/Thatcham Impacts, as well as meeting and/or exceeding pedestrian impact regulatory requirements, e.g., EEVC, ACEA (Phase II), and GTR. EEVC Working Group 17 and ACEA (Phase II) correspond to pedestrian impact requirements, the latter being more stringent. They have also developed the test procedures and quantified the maximum permissible damage to a pedestrian leg dummy model when it is impacted by an automobile, so that the pedestrian will be safe during the impact.

Exemplary characteristics of the energy absorbing assembly include high toughness/ductility, thermal stability, high energy absorption capacity, a good modulus-to-elongation ratio, and recyclability, among others, wherein "high" and "good" are intended to mean that the characteristic at least meets vehicle safety regulations and requirements for the given component/element. The support structure, energy absorber, and crash cans individually comprise the same or different plastic material (e.g., thermoplastic material). The support structure, energy absorber, and/or crash can comprise any thermoplastic material or combination of thermoplastic materials that can be formed into the desired shape and provide the desired properties. Desirable modulus values for the materials can be greater than or equal to 0.6 gigaPascals (GPa), specifically 0.6 GPa to 20 GPa, more specifically 3 GPa to 20 GPa. For efficient energy absorption, it is desirable that the material has high value of strain to failure typically 20% to 130%, specifically 30% to 120%, and more specifically, 80% to 110%.

Exemplary materials include thermoplastic materials as well as combinations of thermoplastic materials with elastomeric materials, thermoset materials, metals, and/or composites, such as plastic-metal hybrid structures and/or plastic-composite hybrid structures. Possible thermoplastic materials include polybutylene terephthalate (PBT); acrylonitrile-butadiene-styrene (ABS); polycarbonate; polycarbonate/PBT blends; polycarbonate/ABS blends; copolycarbonate-polyesters; acrylic-styrene-acrylonitrile (ASA); acrylonitrile-(ethylene-polypropylene diamine modified)-styrene (AES); phenylene ether resins; blends of polyphenylene ether/polyamide; polyamides; phenylene sulfide resins; polyvinyl chloride PVC; high impact polystyrene (HIPS); low/high density polyethylene (L/HDPE); polypropylene (PP); expanded polypropylene (EPP); and thermoplastic olefins (TPO). For example, the support structure, energy absorber, and/or crash can comprise Xenoy® plastic resin, which is commercially available from SABIC Innovative Plastics IP B.V. The support structure, energy absorber, and/or crash cans can also be formed from combinations comprising at least one of any of the above-described materials.

The overall size, e.g., the specific dimensions of the energy absorbing assembly will depend upon its location in the vehicle and its function, as well as the particular vehicle for which it is intended. For example, the length (l), height (h), and width (w) of the energy absorbing assembly, will depend upon the amount of space available in the desired location of use as well as the needed energy absorption. The depth and wall thicknesses of the support structure, energy absorber, and/or crash cans will also depend upon the available space, desired stiffness, and the materials (or combination of materials) employed. For example, the width, w, of the energy absorber can be less than or equal to 200 millimeters mm, specifically, 50 mm to 200 mm, and more specifically 80 mm to 90 mm. The height, h, of the support structure can be less than or equal to 250 mm, specifically, 50 mm to 150 mm, and more specifically 70 mm to 80 mm. The energy absorber (e.g., crush lobes) can extend the length of the support structure, specifically, the crush lobes can extend across the length of the support structure and the crash cans combined, e.g., to provide energy absorption across the assembly.

The thickness of the walls of the support structure, energy absorber, and/or crash cans can all be the same or can be different to enhance stiffness in a desired direction. For example, the crash cans can have thicker walls at the front than at the back, e.g., the surface facing the BIW, the energy absorber can have thicker walls in the middle or toward one or both ends of the energy absorber, and the support structure can have thicker walls toward the ends where the crash cans are located.

The energy absorbing assembly can be produced by several methods such as molding (e.g., injection molding, injection compression molding), forming, extrusion, and/or any other suitable manufacturing technique. For example, the support structure, energy absorber, and crash cans can be formed by a process such as injection molding, thermoforming, extrusion, and combinations comprising at least one of the foregoing. In various embodiments, in order to attain the desired energy absorption and enable the in situ formation of the assembly, a process that utilizes molds that move in the y-direction (see FIG. 1), such that the assembly comprises openings, e.g., on both sides thereof, in the y direction, with the energy absorbers and support structure are closed in the x and z directions (e.g., have external walls in the x and z directions such that no opening or cavity is formed in those directions, but has openings such that cavities and/or channels are formed in the y direction). (See FIGS. 1-8) The crush lobes can be open in the y direction (e.g., between vertical walls 56 and ribs 54) and optionally have an opening in the x direction (e.g., hollow portion 58 of FIG. 6).

The energy absorbing assembly is designed so as to have greater stiffness in the crash cans than the support structure to absorb significantly higher amount of energy during RCAR/Allianz 15 km/hr outboard impact cases, and greater stiffness in the support structure than in the energy absorber (e.g., crush lobes) so that the supporting structure is stiff enough to provide adequate reaction to the energy absorber for crushing during the lower leg impact case. For example, if the support structure stiffness is "SS", the crash cans can have a stiffness of 2 SS to 5 SS, specifically, 2.5 SS to 4.5 SS. The crush lobes can have a stiffness of 0.2 SS to 0.9 SS, specifically 0.3 SS to 0.7 SS.

A more complete understanding of the components, processes, and apparatuses disclosed herein can be obtained by reference to the accompanying drawings. These figures (also referred to herein as "FIG.") are merely schematic representations based on convenience and the ease of demonstrating the present disclosure, and are, therefore, not intended to indicate relative size and dimensions of the devices or components thereof and/or to define or limit the scope of the exemplary embodiments. Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

FIG. 1 illustrates energy absorbing assembly 10 comprising a support structure 12, an energy absorber 14, and crash can(s) 16. As illustrated in FIG. 2, the support structure 12 comprises a first wall 18 and a second wall 20, and, optionally, a third wall 22. Ribs 24 can be disposed between the first wall 18 and the second wall 20. As illustrated in FIGS. 2 and 3, the ribs 24 can form triangular structures extending across the length of the support structure 12. Ribs 24 increase the stiffness and thus also the energy absorbing capabilities of the support structure so that less damage to the vehicle components located behind the support structure occurs after a collision. In embodiments where the third wall 22 is present, ribs 24 can also be disposed between the second wall 20 and the third wall 22 as displayed in FIG. 3. In one embodiment as illustrated in FIG. 3, horizontal layer(s) 30 separates the first wall 18 and the second wall 20 of the support structure into a structure having an upper portion 32 and a lower portion 34 where the ribs 24 are disposed in the upper portion 32 and in the lower portion 34 between the first wall 18 and the second wall 20. In embodiments where the third wall 22 is present, a horizontal layer 30 can divide the space between the second wall 20 and the third wall 22 into upper portion 32 and lower portion 34 as displayed in FIG. 3. The presence of the third wall 22 with ribs disposed between the second wall 20 and the third wall 22 further increases the stiffness of the support structure 12, allowing the beam to absorb more energy upon an impact and further decreases the amount of damage suffered to the vehicle components located behind the support structure 12.

The support structure 12 can be designed such that the first wall 18, second wall 20, and optional third wall 22 each comprise openings 36 in the direction of the y-axis as shown in FIG. 1 (i.e., the first wall 18, second wall 20, and option third wall 22 can be open on the top and bottom portions of the support structure). The ribs 24 can also be similarly designed to have an opening 36 on the top and on the bottom portions on the support structure (i.e., opening 36 extends in the direction of the y-axis). Such a design can allow for vertical mold movement to occur during processing of the energy absorbing assembly 10 as opposed to horizontal mold movement which generally allows for only a single opening in the direction of the x-axis.

The support structure 12 generally comprises at least one row of ribs 24 extending across the length of the support structure 12. In other embodiments, the support structure 12 can comprise greater than one row of ribs 24. For example, the support structure 12 can comprise greater than or equal to 2 rows of ribs, specifically, greater than or equal to 3 rows of ribs, more specifically, greater than or equal to 4 rows of ribs, and even more specifically, greater than or equal to 5 rows of ribs. The ribs 24 can comprise any shape that will provide the desired stiffness to the support structure 12 to enable it to absorb energy and protect the vehicle components located behind the support structure 12 from damage. The ribs 24 can comprise a shape such as triangular, truss, saw tooth, sinusoidal, lamellar, abs(sin), cycloid, and combinations comprising at least one of the foregoing. The ribs 24 can aid in providing and/or maintaining the connectivity of the support structure 12 to the crash cans 16. In an exemplary embodiment, the ribs 24 can be connected directly to the crash cans 16. In another embodiment, where the support structure 12 comprises side walls (e.g., a fourth wall and a fifth wall, not illustrated) on either end of the support structure, the crash cans 16 can attach to the side walls.

It is also contemplated that, depending on the desired stiffness, the number of vertical walls (e.g., first wall 18, second wall 20, third wall 22, etc.) and/or horizontal walls 30 present on the support structure 12 with ribs disposed between at least two of the vertical walls can be increased or decreased. The vertical walls and the horizontal walls are capable of providing the desired stiffness during impact. In one embodiment, as illustrated in FIG. 2, no horizontal layer 30 is present and only one layer of ribs 24 is disposed between the first wall 18 and the second wall 20, while FIG. 3 illustrates an embodiment where two layers of ribs 24 are present, i.e., between the first wall 18 and the second wall 20 and between the second wall 20 and the third wall 22 and two horizontal layers 30 are present, i.e., one horizontal wall 30 located between first wall 18 and second wall 20 and another horizontal wall 30 located between second wall 20 and third wall 22. In another embodiment, greater than or equal to two layers of ribs can present with no horizontal layers. This is similar to the embodiment illustrated in FIG. 2, but at least one additional vertical wall with ribs disposed therebetween are present. This embodiment can be useful for applications where less impact strength is desired (e.g., for smaller cars). Additionally, without the presence of a horizontal layer 30, the support structure 12 can be extruded providing a simple and cost effective method of manufacturing the support structure 12. The support structure 12 can also optionally comprise two vertical walls (e.g., first wall 18 and second wall 20) and a horizontal wall 30 which separates the support structure into an upper portion 32 comprising ribs 24 and a lower portion 34 also comprising ribs 24.

For small, compact cars, where the packaging space is generally less than in a larger vehicle, only a single layer of ribs (e.g., a first wall and a second wall with ribs disposed therebetween as illustrated in FIG. 2) could be desired. For larger cars which have increased packaging space a greater number of walls with ribs disposed therebetween could be desired to achieve the desired stiffness of the support structure 12. The number of horizontal layers 30 could also be varied depending on the desired stiffness of the support structure, with an increased number of horizontal layers 30 present when increased stiffness is desired and a lower number or no horizontal layers 30 present when a lesser stiffness is desired. When multiple horizontal layers are employed, horizontally moving side cores can be used to form the portions of beam which are in between two horizontal layers, while the vertically moving cores for the other portions.

Turning now to FIGS. 4 and 5, a portion of the energy absorber 14 with two possible design configurations is illustrated. In the design illustrated in FIG. 4, vertical sidewalls 40 connect the energy absorber to the first wall 18 of the support structure 12. In FIG. 4, the sidewalls 40 of the energy absorber 14 do not vary in shape and/or thickness throughout the length of the energy absorber 14 which means that the energy absorber 14 can be extruded, thereby reducing tooling costs for the manufacturer. FIG. 5 illustrates a similar embodiment except that sidewalls 40 contain corrugations 44. The corrugations 44 can provide high stiffness to the energy absorber 14 at a minimal thickness. For example, thickness values as low as 1.2 mm could be used if injection compression molding is employed, with thickness values as low as 1.6 mm could be used for injection molding. In one embodiment, the minimal thickness can be 2.2 mm, e.g., for Xenoy® plastic resin walls. The energy absorber 14 in FIG. 5 is also illustrated in FIG. 1 attached to the first wall 18 of the support structure 12 and to the crash cans 16.

The energy absorber 14 can be configured such that the energy absorber 14 comprises an opening 36 in the space located between the front wall and the sidewalls 40 (i.e., the energy absorber 14 is not enclosed on the top and the bottom with respect to the y-axis). Similar to the support structure 12, such a design allows for vertical mold movement. In one embodiment, as illustrated in FIG. 1, the energy absorber 14 can extend across the length of the energy absorbing assembly in the direction of the x-axis. The energy absorber 14 extends from a first crash can 16 across the support structure 12 to a second crash can 16 (e.g., from an outer end of one crash can to the opposite end of the other crash can). In this embodiment, the energy absorber 14 is attached a front face 50 of the crash can 16 as well as to the first wall 18 of the support structure. In another embodiment, the energy absorber 14 can extend across the length of the support structure 12 and not across the crash cans 16.

Any structure can be used in the design for the sidewalls 40 of the energy absorber 14 including any structure such as vertical, corrugated, quadratic curves, trapezoidal, hexagonal, pentagonal, octagonal, semi-circular, and combinations comprising at least one of the foregoing provided that opening 36 is present. Any structure that allows vertical mold movement can be used as the sidewalls 40 illustrated in FIGS. 4 and 5.

Figure 6:
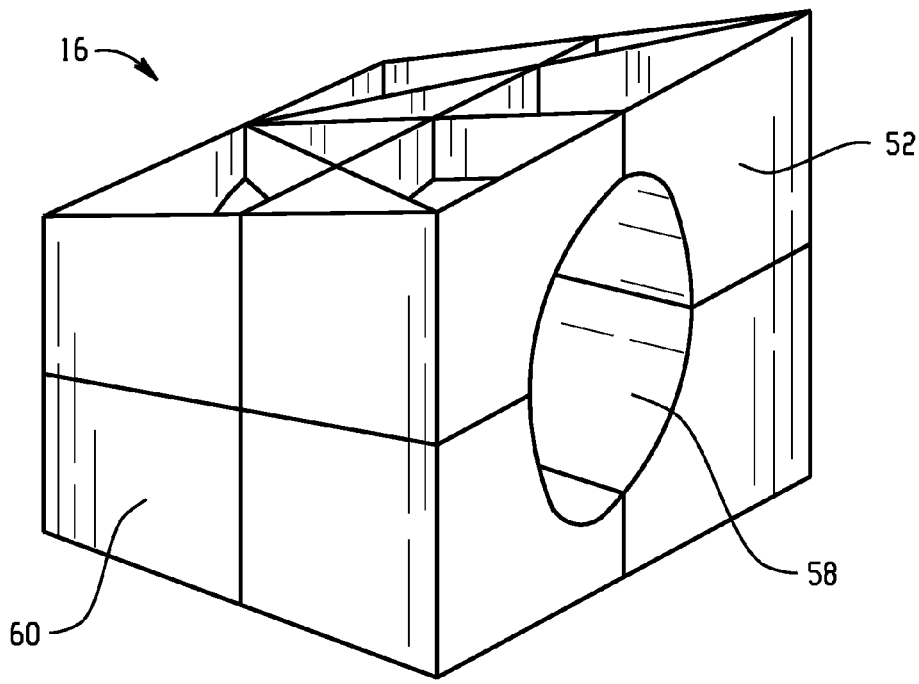
FIG. 6 is a back isometric view of a crush box.
Figure 7:
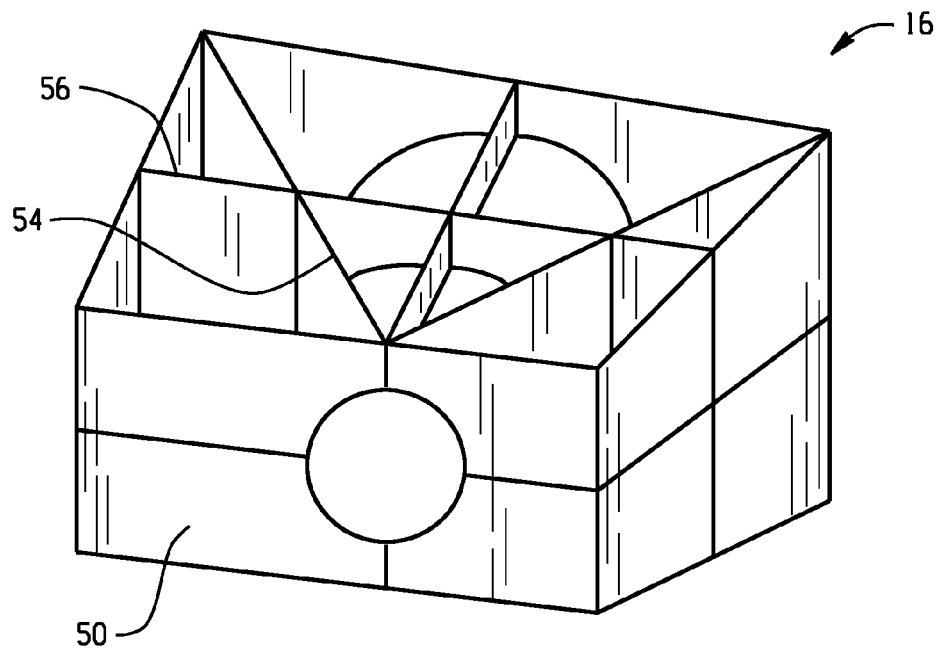
FIG. 7 is a front isometric view of a crush box.

FIGS. 6 and 7 illustrate one embodiment of the crash can 16 component of the energy absorbing assembly 10. FIG. 6 displays the portion of the crash can 16 that attaches to the vehicle components (not illustrated). Specifically, a back face 52 attaches the vehicle rails. Any type of attachment mechanism can be utilized, including, but not limited to, bolt and nuts, screws, adhesives, and combinations comprising at least one of the foregoing. FIG. 6 also illustrates hollow portion 58 located behind back face 52 and surrounded by the ribs 54 and the vertical walls 56. The crash can 16 also comprises side faces 60 which extend from the front face 50 the back face 52. At least one of the side faces 60 attaches to the fourth wall, fifth wall, and/or the ribs 24 of the support structure 12. The ribs 54 and vertical wall 56 provide stiffness to the crash can 16 to aid it in absorbing energy upon an impact. The hollow portion 58 of the crash can 16 is designed to absorb energy and crush upon impact during low speed crashes (e.g., 15 km/hr).

The hollow portion 58 can comprise a conical structure such that the hollow portion comprises a smaller cross sectional area near the front face 50 and a larger cross sectional area near the back face 52. The hollow portion 58 of the crash can 16 can comprise any shape that will provide the desired stiffness upon impact. For example, the hollow portion 58 of the crash cans 16 can comprise a shape such as conical, circular, square, rectangular, elliptical, trapezoidal, parabolic, and combinations comprising at least one of the foregoing. The crash cans 16 can comprise any shape that will provide the desired stiffness upon an impact. For example, the crash cans can comprise a shape such as conical, circular, square, rectangular, elliptical, trapezoidal, and combinations comprising at least one of the foregoing. In one embodiment, the front face 50 of the crash can 16 can attach to the sidewalls 40 of the energy absorber 14. In another embodiment, the sidewalls 40 of the energy absorber 14 do not extend to the crash cans 16. In another embodiment, the crash cans 16 do not comprise the hollow portion 58 and instead comprise ribs 54 and vertical wall 56 in the area between the front face 50, back face 52 and side face 60.

In one embodiment, the crash cans 16 can be designed to not outwardly extend past the first wall 18 of the support structure. The crash cans 16 can be designed so that the front face 50 of the crash cans 16 are aligned with the first wall of the support structure 12. Such a design facilitates an energy absorbing assembly 10 where the energy absorber 14 extends across the entire length of the energy absorbing assembly 10.

Figure 8:
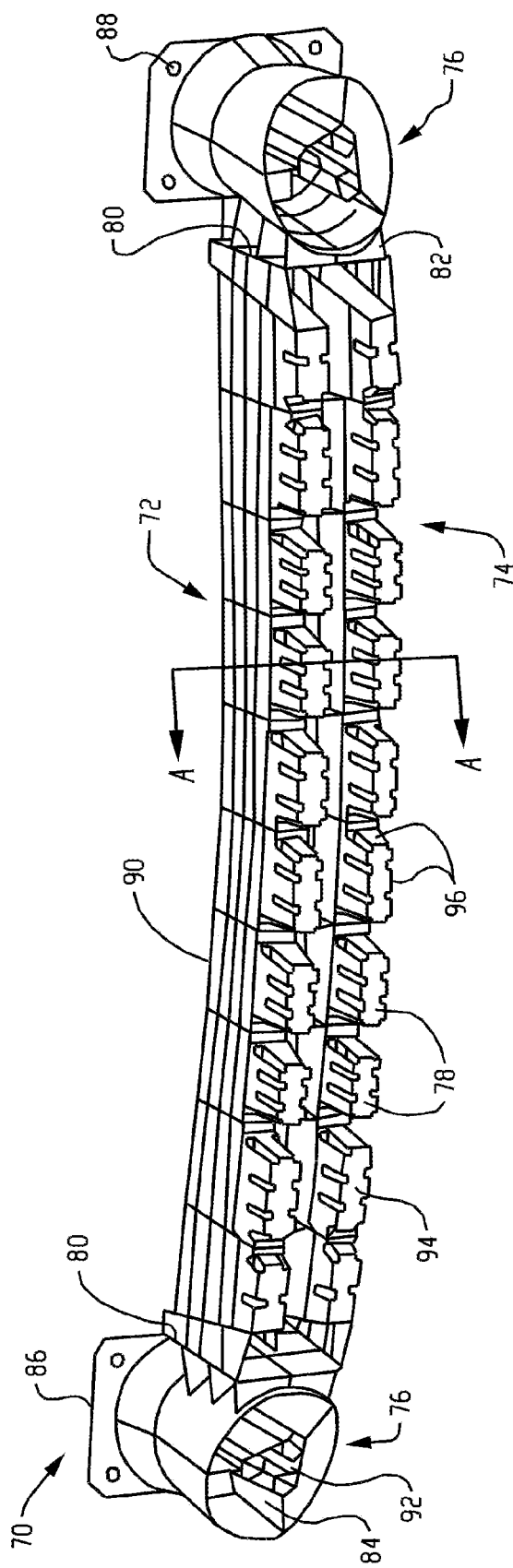
FIG. 8 is an isometric view of an energy absorbing assembly comprising a bumper beam, energy absorber, and crash cans.
Figure 9:
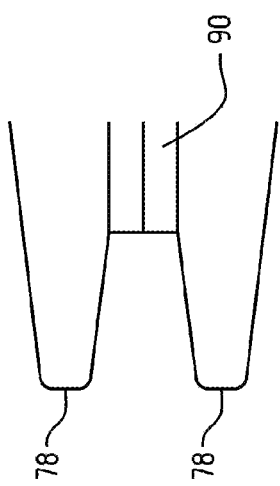
FIG. 9 is a cross-section side view of the energy absorbing assembly of FIG. 8 taken along line A-A.

FIGS. 8 and 9 illustrate a different embodiment of an energy absorbing assembly 70. FIG. 8 illustrates an integrated design of a support structure 72, energy absorber, 74, and crash cans 76. As can be seen in FIG. 8, the support structure comprises a rear portion 90 and side portions 80. Ribs 82 protrude from the side portions 80 (e.g., extend outward from side portions 80) and connect the support structure 72 to the crash cans 76. As illustrated in FIG. 8, the rear portion 90 can comprise a multi-layer structure to provide increased stiffness to the support structure 72. For example, the rear portion 90 can comprise greater than or equal to 1 layer, specifically, greater than or equal to 2 layers, more specifically greater than or equal to 3 layers, still more specifically, greater than or equal to 4 layers, and even more specifically, greater than or equal to 5 layers. A plurality of crush lobes 78 form the energy absorber 74 and protrude outwardly from the rear portion 90 of the support structure 72. The crush lobes 78 comprise a front wall 94 attached to sidewalls 96. The crush lobes generally comprise four sidewalls 96. The energy absorber 74 can extend across the length of the support structure 12 in one embodiment.

The crash cans 76 contain an attachment portion 86 with holes 88 (e.g., for bolt, nuts, and/or screws) that can be used to attach the crash cans 76 to the vehicular rails. The crash cans 76 contain a hollow portion 84 which is designed to provide protection to a driver and/or occupant's lower leg during an impact. In one embodiment, the crash cans 76 comprise a honeycomb structure 92 located in the hollow portion 84. The honeycomb structures can be formed, for example, using injection molding (one process for the molding of complete assembly) where the tool moves in the horizontal direction. The crash cans can be aligned with the front wall 94 of the energy absorber 74 such that the crash cans 76 do not extend past the front face of the energy absorber. The crash cans are intended to deform and absorb energy upon impact thereby decreasing the amount of energy that reaches the driver or occupant of the vehicle. The crash cans 76 absorb energy during an offset angled barrier impact of 15 kilometers per hour (kph) for RCAR impact requirements. The crash cans are able to satisfy the requirements of the test, i.e., the rail upon which the crash cans are supported don't undergo permanent damage, there is minimum or no damage to the surrounding components, and the force generated at the contact during the impact is less than 130 kiloNewtons (kN). Conical crash cans 76 as illustrated in FIG. 8 facilitate easy tooling of this component of the energy absorbing assembly 70. The convergent divergent conical walls with enough draft (e.g., greater than or equal to 4 degrees) facilitates core movement front and rear. This is important because the axial movement of the tool is significantly high, varying from 150 mm to 200 mm. Although conical crash cans 76 are illustrated in FIG. 8, it is contemplated that any shape crush box 76 could be utilized. For example, the crush box 76 could comprise a shape such as conical, circular, square, rectangular, elliptical, trapezoidal, and combinations comprising at least one of the foregoing.

The structure of the crush lobes 78 is also not limited to that illustrated in FIG. 8. The crush lobes can comprise any shape that will provide the desired energy absorption characteristics. It can be of any shape including conical, circular, parabolic, triangular, rectangular, trapezoidal, elliptical or combination of comprising at least one of the foregoing. FIG. 9 is a cross-section side view of the energy absorbing assembly of FIG. 8 taken along line A-A.

A method of making an energy absorbing assembly is also contemplated. For example, a support structure, energy absorber, and crash cans be molded simultaneously to form a single piece integrated energy absorbing assembly, where single piece integrated assembly refers to the fact that the energy absorbing assembly components (i.e., support structure, energy absorber, and crash cans) cannot be separated from one another without damage to one of the components. Any method in which the support structure, energy absorber, and crash cans can be formed as an integrated energy absorbing assembly can be used. For example, the energy absorbing assembly can be molded by a process such as injection molding, extrusion, thermoforming, blow molding, and combinations comprising at least one of the foregoing. When injection molding is used to form the energy absorbing assembly 10, vertical mold movement can be used creating open spaces in the top and bottom of the support structure and in the top and bottom of the energy absorber.

The energy absorbing assembly is further illustrated by the following non-limiting examples.

EXAMPLES

The Following Examples are all Simulations.

Simulated tests were conducted to validate the energy absorbing assembly for three major impacts: lower leg pedestrian impact, center pendulum impact per ECE-42 protocols, and 10-degree RCAR impact. A generic vehicle with a curved polypropylene (PP) fascia, grille, a polycarbonate (PC) glass skin for the headlamp, a 25 pounds per square inch (psi) steel as the outer bonnet and a 2 mm thick steel spoiler as the lower-leg protector was chosen for study. The energy absorber material used was Xenoy® plastic resin (PC/PBT blend) and the average thickness was maintained as 2.2 mm. The complete length of the assembly was maintained at 1,200 mm, width of 100 mm and a height of 100 mm. Pedestrian legform and the pendulum were allowed to hit this vehicle with velocities as specified by the regulations mentioned above. The energy absorbing system weighed approximately 2.1 kilograms (kg), which is lighter than designs comprising a metal support structure and/or metal crash cans, where the assembly weighs approximately 3.2 kg. The weight reduction is observed to be greater than 35%. The added advantage of a single piece assembly reduces the assembly cost by at least 50% because the costs associated with attaching the energy absorber over the support structure and the cost involved in attaching the support structure to the crash cans are completely eliminated with the present design.

Figure 10:
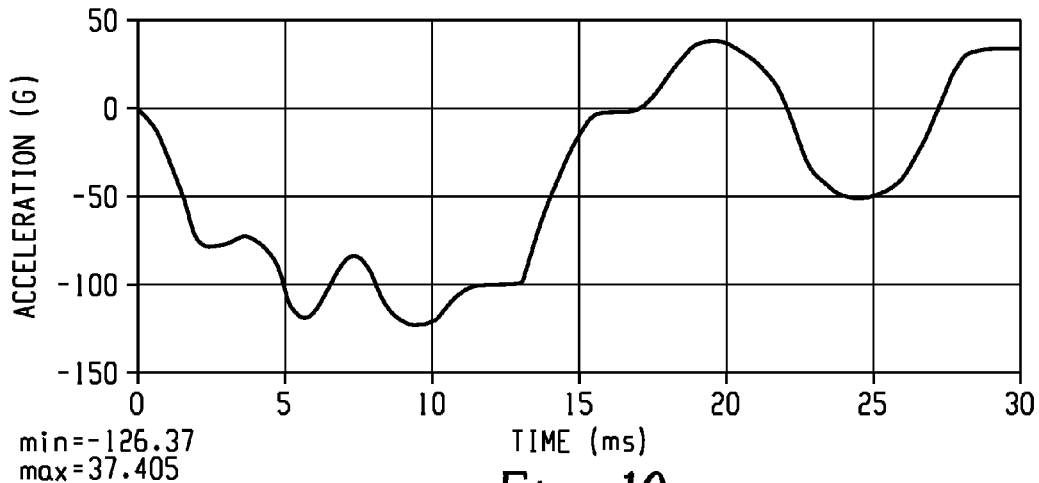
FIG. 10 is a graph illustrating acceleration versus time for pedestrian lower leg impact testing.

FIG. 10 displays a side view of the performance of the design of FIG. 1 when the energy absorbing assembly is subjected to a lower leg pedestrian impact. Lower leg pedestrian impact tests were conducted using a vehicle platform with a 3 millimeter (mm) thick polypropylene fascia, a glass filled lower spoiler, and a stiff member on the top to emulate the hood are used in conjunction with the single piece energy absorbing assembly. Results are measured after no impact (0 milliseconds (ms)), after 8 ms, and after 16 ms. The legform is allowed to impact the vehicle assembly with a velocity of 40 km/hr and the acceleration, rotation, and shear at the knee location are measured to qualify the damage. The measured values were observed to be well within the values prescribed by regulations (ACEA-phase II).

In another pedestrian lower leg impact test the support structure undergoes negligible deflection when it is subjected to lower leg pedestrian impact. The displacement of the beam was observed to be less than 10 mm and was purely in the elastic regime; i.e., it did not undergo any permanent damage. The energy absorber walls buckle near the midpoint and absorb energy. Additionally, it is observed that the front walls of the energy absorber also absorb some energy by virtue of their bending action, which contributes to having a highly efficient energy absorbing assembly. The energy absorber crushes completely and absorbs a sufficient amount of energy; i.e., the energy absorber absorbs approximately 400 joules (J) of energy which is almost 50% of the total impact energy. The remaining energy is usually absorbed by the other vehicle components. The force levels are maintained steadily at 15 kiloNewtons (kN) after the front portion of the energy absorber crushes completely. The performance of the energy absorbing assembly is approximately 126 G acceleration (wherein G acceleration is due to gravity at the Earth's surface), less than 10 degrees of rotation, and a shear of less than 2.4 mm, with a packaging space of less than 50 mm, all of which meet the Phase II regulation requirements of less than 150 G acceleration, less than 15 degrees rotation, and less than 6 mm of shear by about 20%. In other words, the energy absorbing assembly has about a 20% safety margin over the Phase II regulation requirements.

Figure 11:
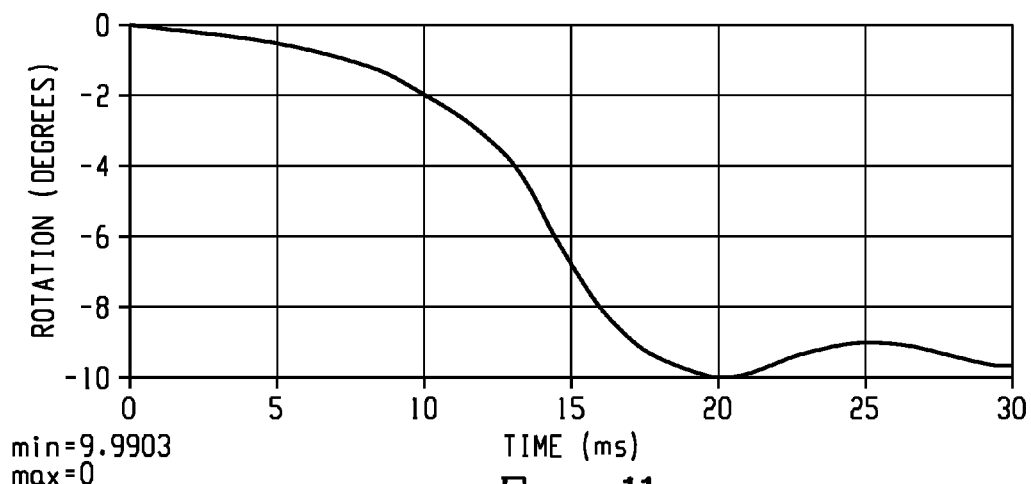
FIG. 11 is a graph illustrating rotation versus time for pedestrian lower leg impact testing.
Figure 12:
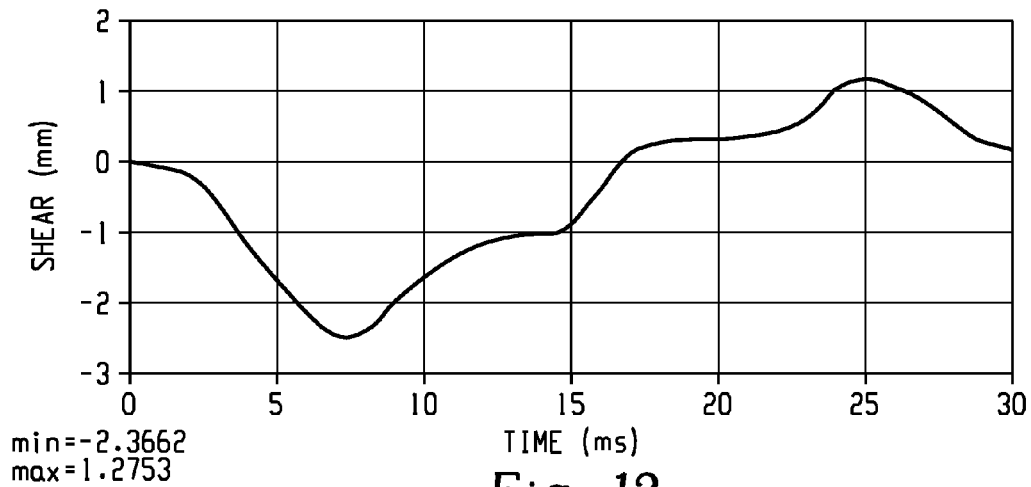
FIG. 12 is a graph illustrating shear versus time for pedestrian lower leg impact testing.
Figure 13:
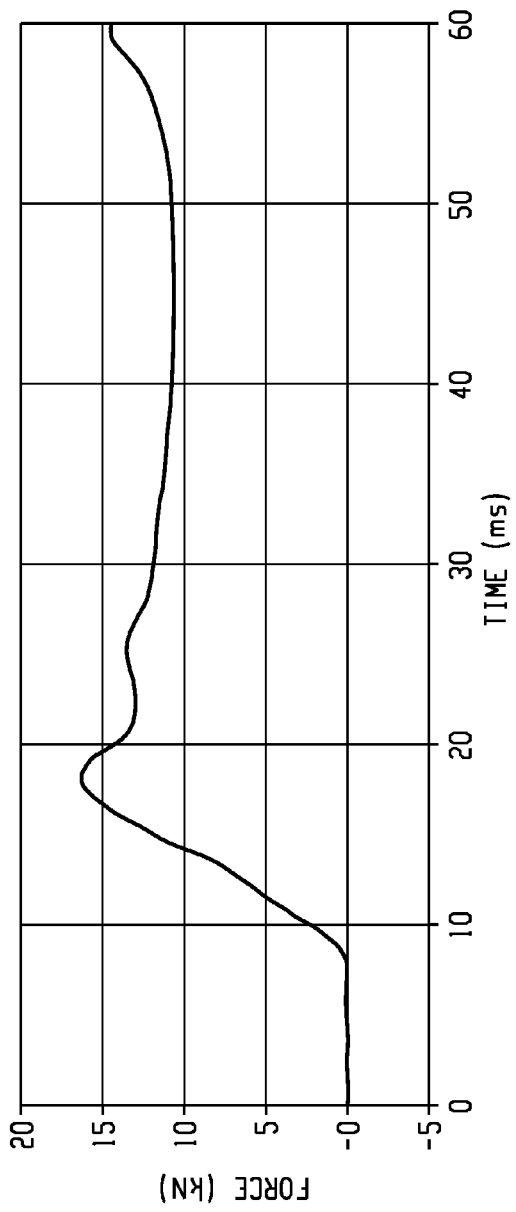
FIG. 13 is a graph illustrating the force observed in center pendulum testing.
Figure 14:
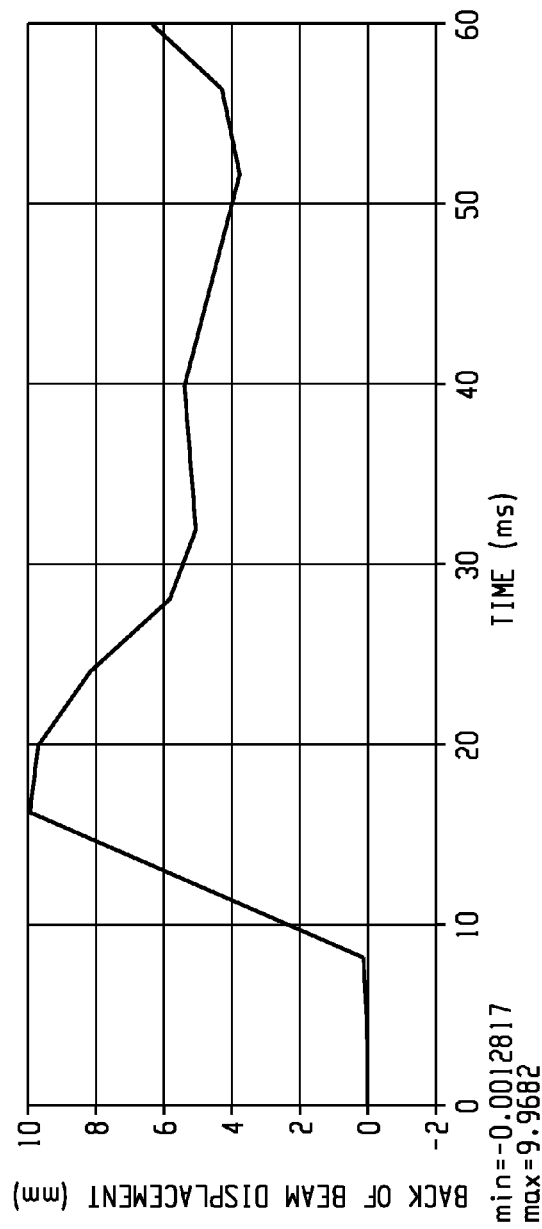
FIG. 14 is a graph illustrating the back of the beam displacement versus time observed in center pendulum testing.

FIGS. 10, 11, and 12 display graphical results of the acceleration, rotation, and shear testing of the energy absorbing assembly as described above. These graphs represent the magnitude of the acceleration, rotation and the shear at the knee joint of the legform during the impact. The maximum permissible values according to the regulation are 150 G, 15 degrees, and 6 mm, respectively. These results are very difficult to achieve using metallic support structures, as metallic beams are very stiff for the low speed impact cases. As a result, the efficiency of the energy absorbing assembly described herein is very high, which can be observed in FIGS. 13 and 14. Efficiency is the ratio of the area under the obtained force versus intrusion curve and the area of the rectangle with length and breadth as the intrusion and maximum force level. Therefore, for an energy absorber assembly to be efficient, the area should be as high as possible and hence the dip in the force vs. intrusion curve after the first peak should be minimal, as shown in FIGS. 13 and 14. The complete energy absorbing assembly also performs well for center pendulum impact testing as per ECE-42 regulatory requirements and RCAR impact.

Figure 15:
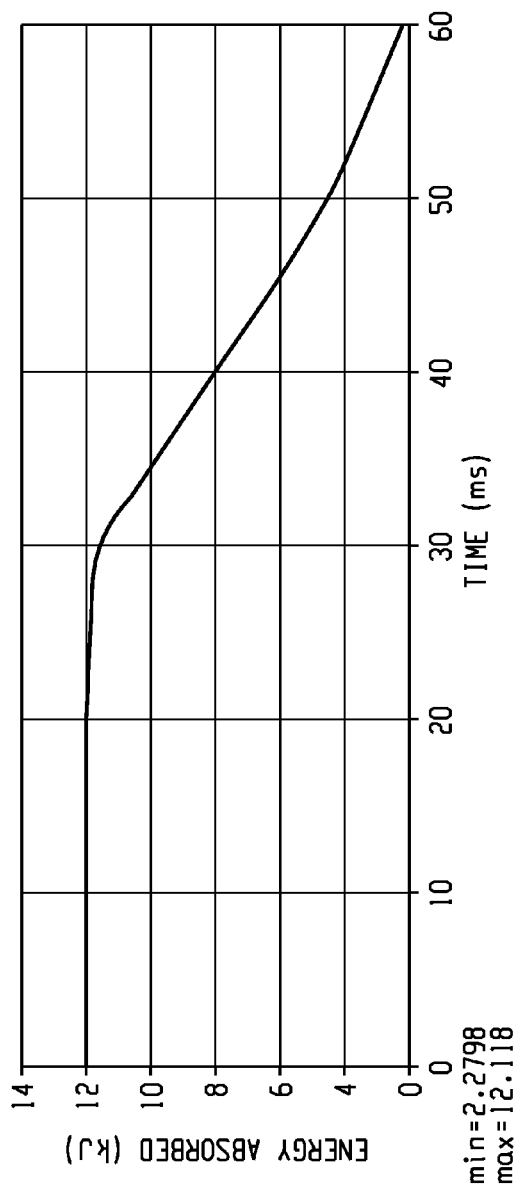
FIG. 15 is a graph illustrating the amount of energy absorbed versus time for vehicle damageability results.
Figure 16:
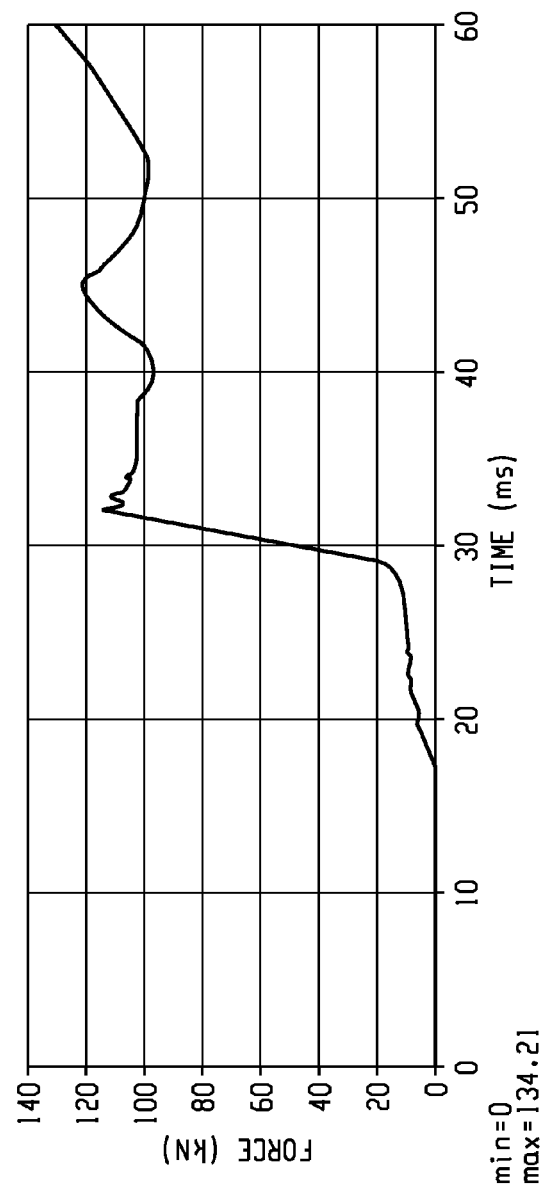
FIG. 16 is a graph illustrating the force versus time for vehicle damageability results.
Figure 17:
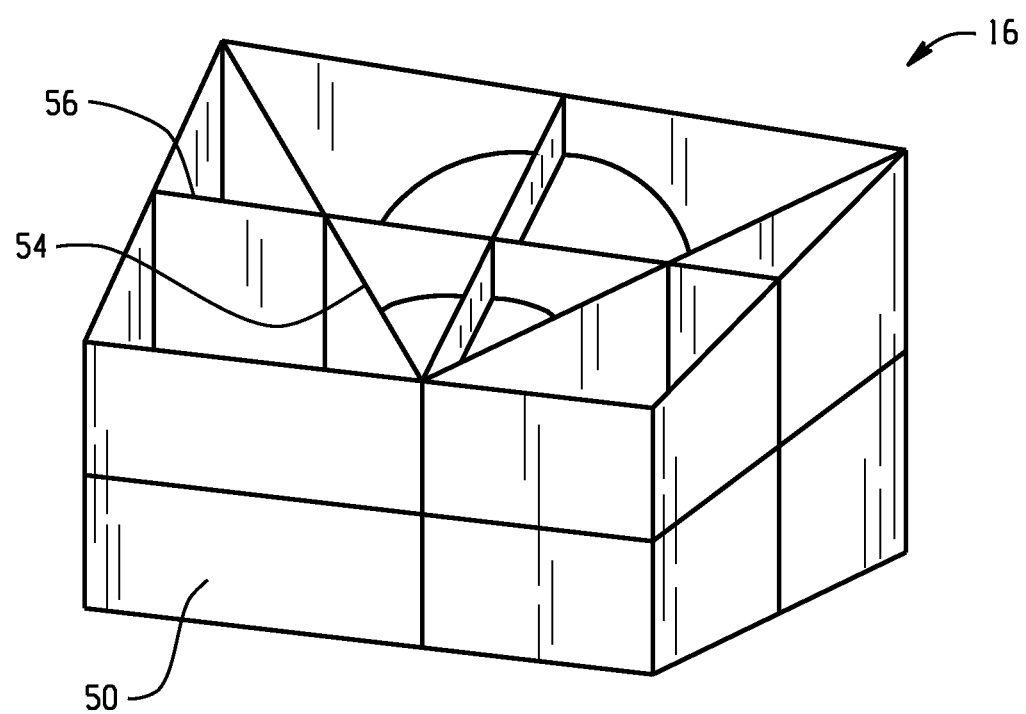
FIG. 17 is a front isometric view of a crush box.

FIG. 15 displays the results of the energy absorbing assembly for RCAR impact. The crash can crushes axially and absorbs up to 10 kiloJoules (kJ) of energy during the impact as illustrated in FIGS. 15 and 16. The force levels are maintained at around 120 kN during this testing. This is reaction force experienced during the impact. The force generated during the impact should not be high enough to cause a permanent damage to the rails on which the crash cans are mounted. The rail is observed to undergo no plastic deformation during the impact. However, if the energy levels involved are lower, the crash cans can be designed to be less stiff.

The energy absorbing assemblies described herein comprise a single piece integrated assembly, which means that the individual components, e.g., support structure, energy absorber, and crash cans, cannot be separated from one another without causing damage to one of the other components. Each of the support structure, energy absorber, and crash can comprise a thermoplastic material, thereby lowering the overall weight of the energy absorbing assembly. The integrated design also decreases processing and assembly time, and therefore also reduces the cost of the energy absorbing assembly, while at the same time providing equivalent or greater energy absorbing characteristics.

In an embodiment, an energy absorbing assembly can comprise: a support structure having a first wall and an outer wall that extend in an x direction from a first end to a second end; an energy absorber that extends across the first wall of the support structure, the energy absorber comprising a plurality of crushable members are configured to crush and absorb energy upon impact, a first crash can; and a second crash can, wherein the first and second crash cans extend from the first and second ends of the support structure. The energy absorbing assembly is an in situ formed single element.

In one embodiment a vehicle comprises a body and rails and an energy absorbing assembly. The energy absorbing assembly comprises a support structure having a first wall and an outer wall that extend in an x direction from a first end to a second end; an energy absorber that extends across the first wall of the support structure, the energy absorber comprising a plurality of crushable members are configured to crush and absorb energy upon impact, a first crash can; and a second crash can, wherein the first and second crash cans extend from the first and second ends of the support structure and wherein the first and second crash cans attach to the rails without a bumper beam. The energy absorbing assembly is an in situ formed single element.

In one embodiment, a method of making an energy absorbing assembly can comprise: introducing molten thermoplastic material to a mold to, in situ form the energy absorbing assembly comprising a support structure, energy absorber, first crash can, and second crash can, wherein the support structure has a first wall and an outer wall having ends, wherein the first and second crash cans extend from the ends of the support structure, and the energy absorber extends across the first wall of the support structure; and removing the energy absorbing assembly from the mold by moving the mold in a y direction.

In the various embodiments, (i) the support structure can comprise openings in a y direction, and/or the energy absorber comprises openings in the y direction, and/or the crash can comprises openings in the y direction; and/or (ii) the energy absorber can extend in the x direction across the first crash can, the support structure, and the second crash can (e.g., can extend in the longitudinal direction across a front of the energy absorber assembly); and/or (iii) the support structure, energy absorber, and crash can each comprise a thermoplastic material; and/or (iv) the first and second crash cans comprise a back face with a cavity open from the back face, wherein the cavity converges toward the front face; and/or (v) the support structure has a structure stiffness, and wherein a stiffness of the first and second crash cans is greater than the structure stiffness, and wherein a stiffness of the energy absorber is less than the structure stiffness; and/or (vi) the support structure has a sufficient stiffness to enable the energy absorber to crush and absorb energy upon impact without a metal bumper beam; and/or (vii) the first and second crash cans comprise attachments sections configured for direct attachment to vehicle rails; and/or (viii) the outer wall of the support structure is a solid wall; and/or (ix) the energy absorber has a solid wall outer wall located opposite the support structure outer wall; (x) the front face of the first and second crash can is a solid wall; and/or (xi) the first and second crash cans do not extend past the front wall of the energy absorber; and/or (xii) the energy absorbing assembly has cavities that are open in the y direction on both sides of the energy absorbing assembly; and/or (xiii) the energy absorber and the support structure have solid outer walls that extend in the x and y directions.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to d one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. An energy absorbing assembly, comprising:
a support structure having a first wall and an outer wall that extend in an x direction from a first end to a second end;
energy absorber that extends across the first wall of the support structure, the energy absorber comprising a plurality of crushable members configured to crush and absorb energy upon impact,
first crash can; and
second crash can, wherein the first and second crash cans extend from the first and second ends of the support structure;
wherein the energy absorbing assembly is an in situ formed single element, and wherein the energy absorber extends in the x direction across the first crash can, the support structure, and the second crash can; and
wherein the first and second crash cans comprise a back face with a cavity open from the back face, wherein the cavity converges toward a front face.

2. The energy absorbing assembly of claim 1, wherein the support structure comprises openings in a y direction, and/or the energy absorber comprises openings in the y direction, and/or the crash can comprises openings in the y direction.

3. The energy absorbing assembly of claim 2, wherein the support structure, energy absorber, and crash can each comprise a thermoplastic material.

4. The energy absorbing assembly of claim 1, wherein the support structure has a structure stiffness, and wherein a stiffness of the first and second crash cans is greater than the structure stiffness, and wherein a stiffness of the energy absorber is less than the structure stiffness.

5. The energy absorbing assembly of claim 1, wherein the support structure has a sufficient stiffness to enable the energy absorber to crush and absorb energy upon impact without a metal bumper beam.

6. The energy absorbing assembly of claim 1, wherein the first and second crash cans comprise attachment sections configured for direct attachment to vehicle rails.

7. The energy absorbing assembly of claim 1, wherein the outer wall of the support structure is a solid wall.

8. The energy absorbing assembly of claim 1, wherein the energy absorber has a solid front wall located opposite the support structure outer wall.

9. The energy absorbing assembly of claim 1, wherein a front face of the first and second crash can is a solid wall.

10. The energy absorbing assembly of claim 1, wherein the first and second crash cans do not extend past a front wall of the energy absorber.

11. A vehicle comprising:
   a body having a frame and rails;
   an energy absorber assembly comprising
      a support structure having a first wall and an outer wall that extend in an x direction from a first end to a second end;
      energy absorber that extends across the first wall of the support structure, the energy absorber comprising a plurality of crushable members are configured to crush and absorb energy upon impact,
      first crash can; and
      second crash can, wherein the first and second crash cans extend from the first and second ends of the support structure, and wherein the first and second crash cans attach to the rails;
   wherein the energy absorbing assembly is an in situ formed single element; and
   wherein the first and second crash cans comprise a back face with a cavity open from the back face, wherein the cavity converges toward a front face.

12. A method of making an energy absorbing assembly, comprising:
   introducing molten thermoplastic material to a mold to, in situ form the energy absorbing assembly comprising a support structure, energy absorber, first crash can, and second crash can, wherein the support structure has a first wall and an outer wall having ends, wherein the first and second crash cans extend from the ends of the support structure, and the energy absorber extends across the first wall of the support structure; and
   removing the energy absorbing assembly from the mold by moving the mold in a y direction; and
   wherein the first and second crash cans comprise a back face with a cavity open from the back face, wherein the cavity converges toward a front face.

13. The method of claim 12, wherein the energy absorbing assembly has open cavities in the y direction on both sides of the energy absorbing assembly.

14. The method of claim 12, wherein the energy absorber further extends across the first and second crash cans.

15. The vehicle of claim 11, wherein the support structure, energy absorber, and crash can each comprise a thermoplastic material.

16. The energy absorbing assembly of claim 1, wherein the energy absorbing assembly absorbs greater than or equal to 850 Joules of impact energy.

17. The energy absorbing assembly of claim 1, wherein the energy absorbing assembly is configured for pedestrian protection.

* * * * *